Patented Oct. 17, 1933

1,930,681

UNITED STATES PATENT OFFICE 1,930,681

MANUFACTURE OF BENZANTHRONE

Alphons O. Jaeger, Mount Lebanon, and Lloyd C. Daniels, Crafton, Pa., assignors to The Selden Company, Pittsburgh, Pa., a corporation of Delaware No Drawing. Application July 24, 1929
Serial No. 380,751

8 Claims. (Cl. 260—61)

This invention relates to the manufacture of benzanthrone.

In the past benzanthrone has been prepared from relatively pure anthraquinones produced by the chemical oxidation of anthracene or by synthetic process from phthalic anhydride and benzol. It has also been proposed to use highly purified anthraquinone produced by the catalytic oxidation of anthracene.

Surprising as it may seem we have found that anthraquinone of wide variation of purity as produced by the catalytic oxidation of anthracene of extremely wide variation in anthracene content can be directly used for the production of benzanthrone, or in some cases can be used after minor purification. The impurities present are very different than those usually encountered in the anthraquinone from chemical oxidation or from the condensation of phthalic anhydride and benzol. Thus, for example, certain oxidation products of phenanthrene, such as phenanthraquinone, diphenic acid, phthalic anhydride and maleic acid are present and in many cases some oily impurities, e. g. dead oils, which, however, are evidently destroyed in the preparation of benzanthrone or are rendered harmless, and even in cases of very impure anthraquinone containing in some extreme cases up to 40% of impurities a very satisfactory grade of benzanthrone can be obtained. As the new methods of catalytically oxidizing anthracene of various grades of purity, particularly the use of stabilized catalysts as described in the co-pending application of A. O. Jaeger, Serial No. 264,571 filed March 24, 1928, can handle very low grades of anthracene which are extremely cheap, the present process opens up an important field for the production of benzanthrone from cheap materials, the use of which for such purposes has hitherto not been considered.

The present invention is not limited to the use of any particular grade of impure anthraquinone and higher grades of impure anthraquinone produced by catalytic oxidation of anthracene are included in the invention. It should also be understood that derivatives of anthraquinone, such as halogen-substituted anthraquinones, insofar as these derivatives can be produced by catalytic oxidation, may be used for the production of the corresponding benzanthrones. Most of the impurities in the crude anthraquinone which are not destroyed by sulfuric acid in the benzanthrone process are solids, and although the benzanthrone reaction is heterogeneous as to phase, apparently the increase in the amount of the solid phase due to the impurities does not affect the reaction injuriously as to yields. This behavior is quite unexpected and may be due to a number of reasons which have not as yet been definitely proven and the invention is, of course, in no sense limited to any theory as to the action of the impurities.

It is a further advantage of the present invention that the impurities which are not removed in the production of benzanthrone, and which may amount to as much as 40%, not only do not injuriously affect the quality of the benzanthrone for caustic fusion to dibenzanthrone, but actually act as reducing agents, permitting the elimination or a reduction in the amount of added reducing agent required in these processes. The invention, therefore, not only permits the production of benzanthrones from cheaper raw materials but the benzanthrones thus produced can be more economically used in caustic fusions than can benzanthrones produced from commercially pure anthraquinones.

The invention will be described in greater detail in connection with the following specific examples, which illustrate the typical embodiments of the invention without restricting in any manner the scope thereof.

Example 1

A sufficient amount of crude anthraquinone containing 65 to 75% anthraquinone content, which may for example be obtained by the catalytic oxidation of 20 to 30% crude anthracene by means of a stabilized catalyst, is dissolved in 200 to 250 parts of 93 to 95% sulfuric acid, the amount being such that the solution contains 10 parts of 100% anthraquinone. The amount of acid used will vary somewhat, the larger amount of acid being used with the less pure anthraquinone. Preferably the anthraquinone is added slowly at a moderate temperature (below 40° C.) with vigorous agitation to prevent forming tarry lumps. After solution is complete, small portions of aluminum in the form of powder, fine shot or turnings are added during 45 to 120 minutes until a total of 1.2 to 1.4 parts of aluminum have been added. The temperature is maintained at 30 to 40° C. during the addition of the metal, and care is taken that each portion is fully dissolved before the next portion is added. After all the metal has been added the mixture is held at a temperature of 35 to 40° C. for at least thirty minutes to assure complete solution of the metal.

The amount of metal added is 50% more than that required to reduce the anthraquinone to oxyanthranol. Larger amounts of metal may be used, up to slightly more than necessary to reduce all the anthraquinone to anthranol, but the best yields are obtained when the amount of metal added is sufficient to form a mixture of anthranol and oxyanthranol, containing the latter in excess.

The mixture is then cooled to 10° C. or lower, and sufficient ice is added to dilute the acid to 86–88%, based on the original amount of acid used and disregarding any formation of water during the reduction. The ice is added in small portions, preferably with external cooling, which should be continued until more than half of the ice has been added so as to prevent the batch temperature from rising above 30° C. before the acid is below 90% concentration. 18 parts of glycerin, mixed with sufficient water to reduce the acid concentration to 80–82% is run into the batch without cooling, and the mixture is then heated to about 110 to 115° C., a vigorous reaction starting and carrying the temperature up to 125 to 135° C. When the reaction moderates, outside heat is applied and the temperature is maintained at 130 to 135° C. for two hours or longer, whereupon the batch is slowly dropped or blown into a lead-lined vat containing sufficient water to dilute the sulfuric acid to a concentration suitable for filtering, for example 8 to 15%. More rapid filtering is obtained if 40 to 50% of the water is present in the vat and is hot or actually boiling, providing for a preliminary dilution, which is then followed by adding enough cold water to complete the dilution.

The precipitate is filtered off, washed acid-free with hot water and then alternately with hot sodium carbonate solution, 0.1 to 0.2% concentration, and hot water until the alkali removes no more colored impurities. The product is then washed alkali-free with hot water and dried. An analysis shows 58 to 67% benzanthrone with a yield of 85–90% of theory, and the crude product can either be directly used for fusion with caustic alkalies for the preparation of dibenzanthrone, the impurities serving in part as a reducing agent so that the amount of reducing agent required is less than when high-grade benzanthrone is used, or, if desired, the crude product can be purified by extraction with solvents or by sublimation processes where a purer benzanthrone is required for further operations.

Instead of using aluminum, copper powder or powdered metals more electropositive than copper may be used; alloys of high copper content are also suitable. When copper is used, about three times as much copper is necessary as when aluminum is used, and the reduction is preferably carried out at 15 to 20° C. higher temperature.

Example 2

Crude anthraquinone of 75 to 90% purity, which may be obtained by the catalytic oxidation of crude anthracene of 30 to 50% purity with stabilized catalysts under especially controlled conditions, is subjected to the same treatment as described in Example 1. Crude benzanthrone of 68 to 80% purity is obtained which is well adapted for caustic fusions and which can be easily purified by extraction and crystallization from solvents or by sublimation, particularly when the sublimate is condensed at predetermined temperatures.

Example 3

An anthraquinone of 90 to 95% purity, obtained by the caustic oxidation of semi-refined anthracene of 60 to 70% content, is subjected to the treatment described in Example 1, and results in a crude benzanthrone of 78 to 88% purity.

Instead of using a process as described in Example 1, the following process may be used. An amount of anthraquinone corresponding to 100 parts of 100% anthraquinone is dissolved in 1500 to 1800 parts of 95% sulfuric acid. The mixture is cooled with vigorous agitation to 10° C. or lower, and ice is added with continued cooling to reduce the concentration of the acid to 85 to 87%, requiring about 225 to 290 parts of ice. The temperature of the mixture is permitted to rise to 40 to 50° C. at the finish of this preliminary dilution. A mixture of 200 to 250 parts of glycerin, 97 to 98 parts of aniline oil and sufficient water to dilute the acid to 82% concentration is run slowly into the batch. In calculating the amount of water required, the amount of acid neutralized in the aniline should be taken into consideration, or, if desired, aniline sulfate may be used. During this addition, the temperature of the batch is permitted to rise, but should not be allowed to exceed 90° C. After all of the glycerin and aniline have been added, the batch is heated until a vigorous reaction starts, when the heat of reaction will take the temperature up from about 115° to 130° C. Cooling should be used, if necessary, to keep the temperature at 130 to 135° C. for 30 to 60 minutes. In some cases some outside heat will be necessary.

The product is isolated as described in Example 1 and is about 2 to 3% lower purity than the product prepared by using the metal. The yield, however, is slightly better, 2 to 4%, and the product can be used directly for caustic fusions to dibenzanthrone.

The derivatives of anthraquinone, such as halogen-substituted anthraquinones, may be used in this process, producing the corresponding benzanthrones.

Example 4

Off-grade products from the sublimation of catalytic anthraquinone and which contain impurities which for the most part are readily removed in the benzanthrone process are equally suited for the production of benzanthrone as described in the foregoing examples. A very pure benzanthrone is obtained of only 3 to 5% lower purity than when commercially pure anthraquinone is used.

Example 5

Tailings from a fractional condenser in which the vapors from the catalytic oxidation of 82 to 95% anthracene are condensed at predetermined temperatures are used to produce benzanthrone by the processes described above. Under satisfactory conditions these tailings amount to 10 to 20% of the anthraquinone obtained from the converters, and the utilization of these tailings in the present process is of great commercial importance as they do not have to be reworked or purified, and, hence, constitute a raw material which has a very low cost.

In any of the procedures described above after dissolving the anthraquinone in the concentrated acid the mixture may be heated to 115 to 130° C. for converting some of the impurities to sulfonic acids; the mixture may then be cooled and the process continued as described above. When this intermediate heat treatment is applied, the final crude benzanthrone is considerably purer due to the more complete removal of the impurities as sulfonic acids.

The term "anthracene substance" is used to cover both pure and impure anthracenes and the derivatives thereof which are susceptible to catalytic oxidation to anthraquinone substances.

What is claimed as new is:

1. A method of producing caustic alkali fusion products of benzathrone substances, which comprises subjecting an impure anthraquinone from the catalytic oxidation of anthracene to condensation with glycerol to form a benzanthrone substance and subjecting the product without removal of alkali-insoluble impurities to fusion with caustic alkalies in the presence of a reducing agent.

2. A method of producing caustic alkali fusion products of benzanthrone substances, which comprises subjecting an impure anthraquinone from the catalytic oxidation of anthracene to condensation with glycerol to form a benzanthrone substance and subjecting the product without removal of alkali-insoluble impurities to fusion with caustic alkalies in the presence of an amount of reducing agent less than that required for the fusion of pure benzanthrone under the same conditions.

3. A method according to claim 2, in which the anthraquinone is produced by the catalytic oxidation of crude anthracene.

4. A method according to claim 2, in which the anthraquinone is a tailing from the condensation of vapors from the catalytic oxidation of anthracene.

5. A method according to claim 2, in which the anthraquinone is a tailing from the condensation of vapors from the catalytic oxidation of anthracene, at least a part of the condenser having been maintained at a temperature at which pure anthraquinone precipitates out and the impurities remain volatile.

6. A method according to claim 2, in which the impure anthraquinone is reduced not materially beyond the anthranol stage before condensation with the glycerin.

7. A method according to claim 2, in which the anthraquinone is reduced to a mixture of anthranol and oxyanthranol before condensation with glycerin.

8. A method according to claim 2, in which the impure anthraquinone is reduced in a sulfuric acid solution and the reduced product without isolation caused to react with a substance included in the group consisting of glycerin, acrolein and other substances which are transformed into acrolein when heated with sulfuric acid.

ALPHONS O. JAEGER.
LLOYD C. DANIELS.